Jan. 14, 1964  F. A. BROCK ETAL  3,118,126
SEISMOMETER
Filed May 14, 1959
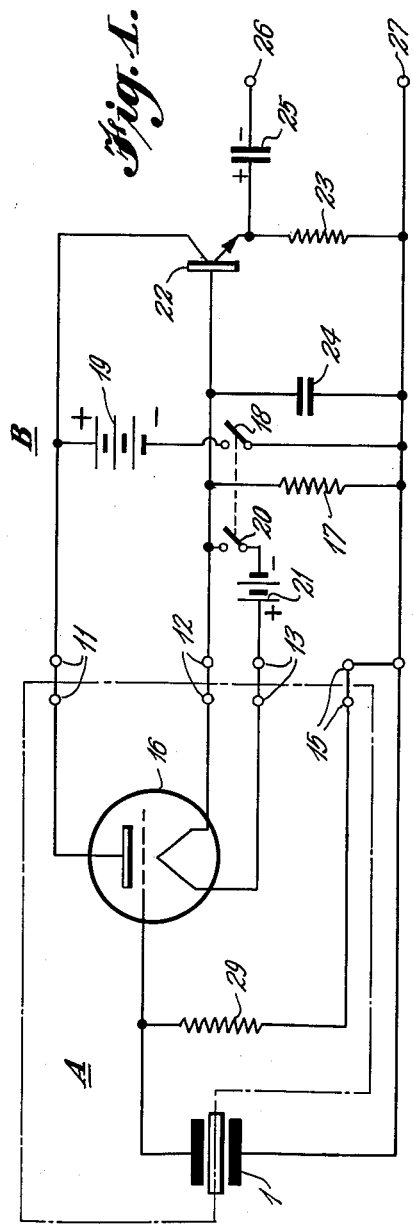
INVENTORS
*Fred A. Brock, Kenneth E. Burg
and Markwick K. Smith*
BY *Stevens, Davis, Miller & Mosher*
ATTORNEYS 3,118,126
SEISMOMETER
Fred A. Brock, Kenneth E. Burg, and Markwick K. Smith, Dallas, Tex., assignors to Texas Instruments Incorporated, Dallas, Tex., a corporation of Delaware
Filed May 14, 1959, Ser. No. 813,136
14 Claims. (Cl. 340—17)

This invention relates to an improved seismometer of the pressure-sensitive type and more particularly to an improved seismometer which produces electrical signals which faithfully represent pressure waves near the earth's surface which result from a seismic disturbance.

Methods for seismic exploration of the earth's subsurfaces' underlying water bodies are now well known. In the practice of these methods, it is known that seismic detectors of the pressure-sensitive type, which are placed within the water layer to detect seismic reflections and convert them to electrical signals, may be used. The active detector element sometimes used in pressure-sensitive seismometers is a piezoelectric crystal. A piezoelectric crystal has features desired in pressure transducers in that: (1) It is an "active" transducer producing an electromotive force in response to pressure changes without the need of excitation signal; (2) its output signal is a relatively faithful reproduction of the pressure variations.

However, the use of piezoelectric transducers in seismic prospecting over water covered areas presents problems. The piezoelectric crystal may be treated as a capacitor in an equivalent circuit analysis. The low frequency response is dependent upon the termination impedance of the crystal. As the capacity values of practical crystals are relatively low, practical units must be terminated in a relatively high impedance to provide suitable response to seismic frequencies. In addition to the need for high impedance termination of the crystal, the source impedance which the transducer offers to the transmission line and corresponding amplifying and recording instruments must be low, in order to keep pick-up of other related or unrelated electrical signals and disturbances to a minimum.

In piezoelectric seismic transducers of the prior art, several or many crystals have been connected in parallel to the high impedance side of a matching transformer. Thus, through the transformer, a low impedance signal source is provided with a high impedance termination of the crystal. Some of the limitations of this arrangement are that: (1) A loss in voltage sensitivity of the crystal, due to the step-down of the transformer, must be accepted in order to make a suitable impedance transformation; (2) protection of the high impedance crystal circuits from the leakage resistance due to contamination of the pressure transmission fluid (usually oil) in the transducer by water (usually sea water) becomes difficult due to the bulky package required for the several crystals.

Although it is desirable to use a flexible casing for such transducers, it has been found virtually impossible to provide a completely moisture-tight seal to such a flexible casing which will prevent water contamination of the transmission fluid and which can, at the same time, be readily opened whenever the internal parts require service attention and then properly resealed thereafter. Thus, it is apparent that a seismometer which is sealed in such a manner as to allow ready access to the component parts will not possess the degree of reliability usually desirable and that a seismometer which is fully hermetically sealed so as to have the desired degree of reliability cannot easily be repaired in the field in the event of failure and again hermetically sealed. The problem was only partially solved in one such pressure-sensitive seismometer of the prior art, wherein two hermetically sealed chambers are provided. A piezoelectric crystal is contained in one chamber, and all of the amplifier is contained in the other. This allows replacement of either a defective amplifier or a defective crystal unit only and avoids returning the entire transducer unit for repair of a minor part. Nevertheless, the hermetically sealed chambers must still be replaced in their entirety. Thus, this seismometer still has the disadvantage that if any part of either the amplifier or the crystal circuit should become defective, then the entire hermetically sealed chamber containing the defective part must be replaced as access may not readily be obtained to the sealed chamber without destroying the hermetic seal.

In the present invention, a high impedance termination for the crystal unit and a low impedance output from the transducer is provided by an electronic power amplifier contained within the transducer. The power amplifier used in the circuit provides no voltage gain and, therefore, cannot become unstable and oscillatory. The voltage loss, on the other hand, is very small in the power amplifier with the result that the sensitivity of the transducer is many times that which can be attained with an equivalent crystal and a practical transformer.

Since the high impedance portion of the circuit is the only portion adversely affected by slight contamination of the transmission fluid surrounding the parts within the transducer case, only that high impedance portion of the circuit is placed within a hermetically sealed chamber. In fact, it is placed within a chamber sealed even against the transmission fluid. A unique hermetically sealed chamber for this high impedance portion of the device is provided by using the piezoelectric crystal itself as the chamber wall. A hollow cylindrical piezoelectric crystal is used with hermetic seals at each end.

According to the present invention, then, one output terminal of the piezoelectric crystal, together with those parts of the power amplifier circuit which carry the signal at a high impedance, are hermetically sealed inside the piezoelectric crystal itself. The remaining parts of the amplifier circuit are located outside the hermetically sealed chamber within the casing of the transducer which constitutes a chamber containing the transmission fluid. Since slight contamination of the transmission fluid will not adversely affect the parts of the circuit with which the fluid is in contact, the seal for the casing can be an ordinary clamp-type seal which provides ready access to the inside of the casing for replacement of defective parts in the low impedance portions of the circuit. Another feature of the present invention is an on-off switch for the power amplifier so designed that it may be operated through the flexible casing of the seismometer.

Therefore, it is one object of the present invention to provide a pressure-sensitive transducer of the type suitable for seismic surveying possessing a high degree of reliability but providing easy access to all parts of the seismometer except the high impedance portion of the circuit.

It is a further object of the present invention to provide a pressure-sensitive transducer wherein certain portions of the device are contained within a unique moisture-proof chamber.

It is a still further object of the present invention to provide a small, compact pressure-sensitive transducer exhibiting enhanced performance and reliability characteristics.

Further objects and advantages will be understood as the following detailed description of the preferred embodiment of the invention unfolds and when taken in conjunction with the drawings wherein:

FIGURE 1 is a schematic diagram of the circuit used in the seismometer;

FIGURE 2 is an axial cross section of the piezoelectric crystal showing the method of sealing;

FIGURE 3 is a partial axial cross section illustrating the seismometer itself; and FIGURE 4 is a cross section through the seismometer showing the details of the switch actuator.

As shown in FIGURE 1, the circuit of the seismometer of the present invention comprises two distinct portions. The high impedance portion of the circuit is that portion enclosed by the dashed lines, and designated generally as A. The low impedance portion of the circuit is designated generally as B.

The high impedance portions A of the circuit are contained within a hermetically sealed chamber which is constituted, in part, by the piezoelectric crystal 1 itself. This hermetically sealed chamber 9 is shown in section in FIGURE 2. As shown in FIGURE 2, the piezoelectric crystal 1 is a cylindrical tube with its inner and outer surfaces, 2 and 3 respectively, metallized. The ends 4 of the cylinder 1 are free of the metallizing, and thus the inner and outer metallized surfaces are separated by a non-conductive area having a high insulation resistance. A hermetically sealed chamber is formed by the cylinder 1, the end seal 5, and the header 6. Any one of several well known sealing means, as for example, an appropriate resin, may be used to provide the hermetic seal between the metallized inner surface of the crystal 1 and the edges of the header 6 and the end seal 5. Connections between the high impedance portion of the circuit A and the low impedance portion of the circuit B are provided by means of through-terminal connectors 11, 12, 13 and 15.

With reference again to FIGURE 1, one of the output terminals, the metallized surface 2 of the crystal 1, is connected to the grid of vacuum tube triode 16 located within the hermetically sealed chamber. The other output terminal, metalized surface 3 of the crystal 1, is connected to the terminal 15 at a point outside of the hermetically sealed chamber. The terminal 15 is connected through grid resistor 29, which has a high resistance and is located within the hermetically sealed chamber, to the grid of the triode 16. The terminal 15 is connected through a cathode resistor 17 located within the chamber formed by the casing of the seismometer but external of the hermetically sealed chamber to the through-terminal 12. The terminal 12 is connected within the hermetically sealed chamber to the cathode of the vacuum tube 16. The terminal 15 is also connected through a switch 18 to one terminal of plate supply battery 19, both located in the casing chamber. The other terminal of plate supply battery 19 is connected via the through-terminal 11 to the plate of the vacuum tube 16. The terminal 12 is also connected through a switch 20 and a battery 21, both located in the casing chamber, to the terminal 13. The terminals 12 and 13 are connected within the hermetically sealed chamber to opposite sides of the cathode heater of the vacuum tube 16. Thus, the battery 21 supplies the power to heat the cathode of the vacuum tube 16 when the switch 20 is closed. The switches 18 and 20 are ganged so that they are either closed or open at the same time. Thus when the switches 20 and 18 are closed, the vacuum tube 16 is connected as a cathode follower to give power amplification to the output signals generated across piezoelectric crystal 1. The output signals from the cathode follower 16 are generated across the cathode resistor 17 between the terminals 12 and 15.

The terminal 12 is connected to the base of a transistor 22 located in the normally sealed chamber. The terminal 15 is connected through a resistor 23, located in the casing chamber, to the emitter of the transistor 22. A capacitor 24, located in the casing chamber, connects the base of the transistor 22 to the terminal 15. The terminal 11 is connected to the collector of the transistor 22. Thus, with the switch 18 closed, the transistor 22 is connected as an emitter follower to amplify the signal appearing across the terminals 12 and 15 with the battery 19 providing the power supply for the transistor. The output signal from the emitter follower appears across the resistor 23.

The emitter of the transistor 22 is connected to an output terminal 26 through a capacitor 25 and the terminal 15 is connected to the output terminal 27. The terminals 26 and 27 thus form the output terminals for the entire circuit and the signal generated by the piezoelectric crystal 1 after being amplified by the vacuum tube 16, connected as a cathode follower, and the transistor 22, connected as an emitter follower, will appear across the terminals 26 and 27. The vacuum tube 16 and the transistor 22 thus connected provide a means for terminating the piezoelectric crystal 1 in a high impedance while presenting a low source impedance to the transmission line which leads to the recording circuit.

Because output terminal 2 of the crystal 1 and the vacuum tube 16 are both located inside a hermetically sealed chamber, all portions of the circuit which carry the signal at a high impedance are located within this hermetically sealed chamber. The hermetic sealing of the chamber prevents any seepage of salt water or other foreign substance to these portions of the circuit and thus any reduction of low frequency response due to the effects of such seepage is prevented. The remaining parts of the circuit, which are enclosed in the casing chamber, carry the signal only at a relatively low impedance. Thus, the effect of any seepage into this normally sealed chamber will not have a serious effect on the signal. Access may be obtained to this clamp sealed chamber to replace defective parts such as a discharged battery, a corroded switch, or a faulty capacitor, resistor or transistor. The hermetically sealed parts of the circuit may be replaced as a unit when either the crystal 1 or the vacuum tube 16 becomes defective.

The illustration of FIGURE 3 shows the structural details of the seismometer. The entire wall of the seismometer is made of a tubular flexible casing 31 which will transmit pressure waves. The tube formed by the casing 31 is sealed at one end by a pressure seal 32 and closed at the other end by a cap 34.

Spaced from the cap 34 in the casing 31 is another seal designated generally by the number 33. The seal 33 is designed so that it may be removed and access obtained to the space within the casing between seals 32 and 33. The seal 33 comprises a cylindrical layer 61 of neoprene fitting within the inner wall of casing 31 and sandwiched between two phenolic cylindrical layers 62 and 63, which also fit within the inner wall of casing 31. A bolt 64 passes through the center of all three layers 61, 62 and 63. A lock nut 65 threaded on bolt 64 is positioned against the layer 63. A nut 66 threaded on bolt 64 is tightened against layer 62 and thus squeezes the neoprene layer 61 against the layer 63, which is held in place by nut 65. A suitable band 67 encircles the casing 31 squeezing neoprene layer 61 to provide an effective seal which may be easily removed.

Electric cable 35 passes through the cap 34 and the seal 33 and connects the output terminals 26 and 27 of the circuit described with reference to FIG. 1 to the connector 80. The connector 80 may be used to connect the seismometer to the transmission line leading to the recording circuit. The entire casing structure may be towed through the water by a cable 36 passing through cap 34 and attached to bracket 81 which is under nut 66. Using this arrangement all stress is placed on the rigid structural parts of the seismometer. A cylindrical bulkhead 40 is positioned within the casing 31 adjacent the seal 32 and fits against the inner wall of the casing 31. Cylindrical bulkheads 37 and 38 fit against the inner wall of casing 31 and are spaced between the bulkhead 40 and the seal 33. Within the space between the bulkhead 37 and the clamp seal 33 is a circular support plate 41 mounted adjacent to the seal 33. The bolt 64 passes through the plate and is threaded into hub 68 positioned against the plate 41. The bulkheads 37, 38 and 40 are all mounted and positioned relative to one another by the bolts 42 which run from the plate 41 down into bulkhead 40. The nuts 69 are tightened against the plate 41, thus holding the plate 41 in position. Mounted within the space 28 between the bulkheads 38 and 40 is the hermetically sealed assembly of FIGURE 2 described previously. The bulkhead 38 is of annular shape allowing the connections to the sealed assembly to pass through. The bolts 42, together with spacers 43 between the plate 41 and the bulkhead 37 and the bulkheads 37 and 38, hold the assembly together. The plate supply battery 19 and the cathode heater supply battery 21 are positioned within the space between the bulkheads 37 and 38. The transistor 22, the resistors 17 and 23, and the capacitors 24 and 25 are all mounted in the bulkhead 38.

The off-on gang switches 18 and 20 are mounted on the bulkhead 37 within the space between the bulkheads 37 and 38. These switches are controlled by an actuator mounted on the other side of the bulkhead 37. The actuator may be operated through the flexible casing 31. The actuator, which is better illustrated in FIGURE 4, is of the toggle type and comprises a block 71 which slides on supporting block 72. The toggle lever 73 is pivoted on block 72 and a pin 74 fixed to the block 71 passes through a slot in the lever 73. An operator can slide the block 71 to either side simply by deforming the flexible casing 31. The position of the block 71 controls the position of the toggle lever 73 which, in turn, controls the condition (either off or on) of switches 18 and 20. Thus, the switches 18 and 20 may be turned off and on without removing the seal 33.

Although the invention has been described with reference to a specific example wherein only one crystal is used, it is obvious that, according to the teachings of the present invention, a seismometer may be constructed utilizing a plurality of sealed high impedance elements connected to a single low impedance amplifier all within the same casing. Also, a plurality of complete systems, each comprising a high impedance and a low impedance circuit, may be placed in a single casing which may be up to several hundred feet long.

The above description constitutes a preferred embodiment of the invention and many modifications may be made thereto without departing from the spirit and scope of the invention which is limited only as defined in the appended claims.

What is claimed is:

1. A seismometer comprising a piezoelectric crystal having a pair of output terminals, impedance transformation means having a high impedance portion and a low impedance portion comprising an electronic circuit between said output terminals of said piezoelectric crystal and a pair of signal output terminals, hermetically sealed means enclosing one output terminal of said crystal and said high impedance portion of said impedance transformation means and a casing enclosing said hermetically sealed enclosure and said low impedance portion of said impedance transformation means.

2. A seismometer as defined in claim 1 wherein said piezoelectric crystal comprises part of said hermetically sealed chamber.

3. A seismometer as defined in claim 1 wherein said impedance transformation means comprises a vacuum tube cathode follower circuit and a transistor emitter follower circuit coupled at the base thereof to the cathode of said cathode follower.

4. A seismometer comprising a casing, means defining a hermetically sealed chamber within said casing, said means including a piezoelectric crystal in the shape of a hollow cylinder, and electronic impedance transformation circuit means within said casing and partially within said chamber having a high impedance portion, the portion of said impedance transformation means within said chamber being the high impedance portion thereof.

5. A seismometer as defined in claim 4 wherein said impedance transformation circuit means comprises a vacuum tube cathode follower circuit and a transistor emitter follower circuit connected to the base of the transistor to the cathode of said vacuum tube and wherein said high impedance portion of said impedance transformation means comprises the vacuum tube and its input circuit.

6. A circuit element comprising means defining a hermetically sealed chamber, said means comprising a piezoelectric crystal in the shape of a hollow cylinder, one output terminal of said crystal being positioned within said chamber, a vacuum tube mounted within said chamber, first circuit means within said chamber connecting said one output terminal to the grid of said vacuum tube, a plurality of terminals providing electrical connections through the walls of said chamber, and a plurality of additional circuit means connecting the elements of said vacuum tube to said plurality of terminals.

7. A circuit element for use in a transducer comprising a piezoelectric crystal and means for amplifying the signal from said crystal, said crystal forming part of a hermetically sealed chamber having at least part of said amplifying means located therein.

8. In a seismometer having a pressure-sensitive transducer and amplifier circuit enclosed within a sealed flexible tubular casing, said amplifier connected to amplify the output signal of said transducer, and a switch connected to turn the power to said amplifier off in a first position and on in a second position, the improvement comprising a block mounted for sliding movement in said casing, said block being positioned to slide along a chord of the cross section of said tubular casing, and means to operate said switch to said first position in response to movement of said block in one direction and to operate said switch to said second position in response to the movement of said block in the opposite direction.

9. A seismometer as defined in claim 8 wherein said power is supplied by a battery located within said casing.

10. A combination comprising a tubular flexible casing, a switch having a first position and a second position mounted within said casing, a block mounted for sliding movement within said casing, said block being positioned in said tubular casing such that said block slides along a chord of the cross section of said tubular casing, and means to operate said switch to said first position in response to the movement of said block in one direction and to operate said switch to said second position in response to the movement of said block in the opposite direction.

11. In a seismometer having a long tubular flexible casing, transducer means defining a hermetically-sealed chamber a high-impedance circuit within said chamber, spaced bulkheads in longitudinal alignment with said chamber and defining freely accessibly normally sealed areas, one of said sealed areas including a low-impedance circuit and a power supply, a pair of gang-controlled switches in the area including said low-impedance circuit and adjacent one side of one of said bulkheads, a toggle-type control lever for operating said switches and extending through said bulkhead, a block having a curvature similar to the inside periphery of said tubular housing adapted to be moved relative to said bulkhead from one peripheral position of the casing to another by a force acting through the flexible casing sidewalls in such a manner as to trip said toggle lever and energize both said circuits when said block is in one only of its peripheral positions.

12. A seismometer as set forth in claim 8 wherein said pressure sensitive transducer includes a piezoelectric crystal.

13. A seismometer as set forth in claim 9 wherein said pressure sensitive transducer includes a piezoelectric crystal.

14. A seismometer as set forth in claim 11 wherein said transducer includes a piezoelectric crystal.

References Cited in the file of this patent

UNITED STATES PATENTS

| | | |
|---|---|---|
| 1,980,993 | Hayes | Nov. 20, 1934 |
| 2,285,561 | Botuck | June 9, 1942 |
| 2,451,176 | Schellman | Oct. 12, 1948 |
| 2,717,368 | Swan | Sept. 6, 1955 |
| 2,750,480 | Freeman | June 12, 1956 |
| 2,757,355 | Howes | July 31, 1956 |
| 2,762,032 | Vogel | Sept. 4, 1956 |
| 2,783,449 | Loofbourrow | Feb. 26, 1957 |
| 2,837,731 | Harris | June 3, 1958 |
| 2,962,695 | Harris | Nov. 29, 1960 |
| 3,003,136 | Burnett | Oct. 3, 1961 |
| 3,059,217 | Boswell | Oct. 16, 1962 |

FOREIGN PATENTS

| | | |
|---|---|---|
| 600,853 | Great Britain | Apr. 21, 1948 |